US006514079B1

(12) United States Patent
McMenimen et al.

(10) Patent No.: US 6,514,079 B1
(45) Date of Patent: Feb. 4, 2003

(54) INTERACTIVE TRAINING METHOD FOR DEMONSTRATING AND TEACHING OCCUPATIONAL SKILLS

(75) Inventors: Kevin McMenimen, West Babylon, NY (US); Matthew P. Sack, Plainview, NY (US)

(73) Assignee: RuMe Interactive, Farmingdale, NY (US)

( * ) Notice: Subject to any disclaimer, the term of this patent is extended or adjusted under 35 U.S.C. 154(b) by 0 days.

(21) Appl. No.: 09/535,195

(22) Filed: Mar. 27, 2000

(51) Int. Cl.[7] .............................. G09B 19/00; G09B 7/00
(52) U.S. Cl. ...................... 434/219; 434/322; 434/323; 434/327; 434/335; 434/362
(58) Field of Search ........................... 434/81–105, 118, 434/219, 220, 221, 222, 223, 224, 225, 226, 227, 234, 247, 248, 249, 250, 251, 252, 253, 254, 255, 256, 257, 258, 262, 263, 265, 267, 275, 322–364

(56) References Cited

U.S. PATENT DOCUMENTS

| | | | |
|---|---|---|---|
| 4,459,114 A | * | 7/1984 | Barwick ..................... 434/307 |
| 5,195,092 A | | 3/1993 | Wilson et al. |
| 5,208,665 A | | 5/1993 | McCalley et al. |
| 5,283,638 A | | 2/1994 | Engberg et al. |
| 5,432,932 A | | 7/1995 | Chen et al. |
| 5,537,141 A | | 7/1996 | Harper et al. |
| 5,603,058 A | | 2/1997 | Belknap et al. |
| 5,625,845 A | | 4/1997 | Allran et al. |
| 5,664,046 A | | 9/1997 | Abecassis |
| 5,684,918 A | | 11/1997 | Abecassis |
| 5,748,956 A | | 5/1998 | Lafer et al. |
| 5,791,907 A | * | 8/1998 | Ramshaw et al. .......... 434/262 |
| 5,818,935 A | | 10/1998 | Maa |
| 5,832,231 A | | 11/1998 | Raman et al. |
| 5,861,881 A | | 1/1999 | Freeman et al. |
| 5,875,306 A | | 2/1999 | Bereiter |
| 5,915,112 A | | 6/1999 | Boutcher |
| 5,923,627 A | | 7/1999 | Miwa et al. |
| 5,930,473 A | | 7/1999 | Teng et al. |
| 5,968,116 A | | 10/1999 | Day, II et al. |
| 5,987,506 A | | 11/1999 | Carter et al. |
| 6,006,278 A | | 12/1999 | Cottrill |
| 6,026,386 A | | 2/2000 | Lannert et al. |
| 6,026,404 A | | 2/2000 | Adunuthula et al. |
| 6,029,159 A | | 2/2000 | Zorba et al. |
| 6,038,367 A | | 3/2000 | Abecassis |
| 6,038,593 A | | 3/2000 | Huckins |
| 6,049,800 A | | 4/2000 | Govindarajan et al. |
| 6,067,401 A | | 5/2000 | Abecassis |
| 6,067,559 A | | 5/2000 | Allard et al. |
| 6,067,582 A | | 5/2000 | Smith et al. |
| 6,072,934 A | | 6/2000 | Abecassis |
| 6,088,747 A | | 7/2000 | Cottugno et al. |
| 6,094,679 A | | 7/2000 | Teng et al. |
| 6,126,448 A | * | 10/2000 | Ho et al. .................... 434/219 |
| 6,157,808 A | * | 12/2000 | Hollingsworth ............. 434/350 |
| 6,213,780 B1 | * | 4/2001 | Ho et al. .................... 434/219 |

OTHER PUBLICATIONS

"Computer–assisted teaching and learning in photogrammery", by Joachim Hohle, ISPRS Journal of Photogrammetry & Remoste Sensing 52 (1997), pp. 266–276.

* cited by examiner

Primary Examiner—John Edmund Rovnak
(74) Attorney, Agent, or Firm—Scully, Scott, Murphy & Presser

(57) ABSTRACT

The present invention is a system and method of interactive multimedia teaching and learning, through the use of audio-visual presentations.

The invention provides a computer based multimedia presentation which may include pictures, sound, graphics and text to provide a trainee with a presentation regarding the performance of an occupational skill.

32 Claims, 8 Drawing Sheets

INTERACTIVE TRAINING METHOD FOR DEMONSTRATING AND TEACHING OCCUPATIONAL SKILLS

TECHNICAL FIELD OF THE INVENTION

The present invention generally relates to multimedia teaching and learning, and more particularly to an interactive training methodology for demonstrating and teaching occupational skills to a trainee.

BACKGROUND OF THE INVENTION

Personal computers and concomitant technology have been instrumental in the way teaching and learning are accomplished. With the proliferation of personal computers in the business arena as well as in the home, this relatively recent media has enhanced the way teaching and learning are performed, positively altering cognitive skills and retention of information by a trainee. Presently available interactive teaching and training systems cover a variety of fields ranging from scholastic teaching and training to business teaching and training.

Within the business arena, there are myriad goals for a productive and efficient training system. These goals include but are not limited to a training system that can mirror real-world scenarios, facilitate attention to and retention of training materials by the trainee, test cognitive abilities of the trainee by providing testing and feedback, and provide reporting and monitoring mechanisms to management.

Interactive teaching and training systems are beneficial for an employer as well as for employees (i.e., trainees). Interactive teaching and training systems are portable and cost effective because it is far cheaper to bring the training to the employee, than to bring the employee to the training. Thus, the employer realizes reduced costs of training and improved performance by employees, which can increase profits and/or limit employer's liability. Furthermore, interactive teaching and training systems provide a measure of consistency. That is, a company-wide level of technical competency will be achieved by eliminating variances that can arise from differing live presentations, while maintaining benefits of live-type instruction. The employer can further realize a high return on its investment with an increase in technical aptitude of its staff, and particularly with concomitant reductions in operational errors of its staff. Interactive teaching and training systems are also flexible. Thus, the employees are able to effectively learn at their own pace with increased retention of information, without distracting other personnel. Furthermore, these systems generally allow supervisors or management to see exactly what their employees are learning and to track their progress, which provide clear and measurable results.

Interactive teaching and training systems for a business environment in a rudimentary sense are based on a computer accepting input, in the form of data or commands, from a human user (e.g., trainee) to facilitate individualized learning or training. In a more concrete sense these systems are aimed at utilizing such human-computer interaction to positively affect the aforementioned goals, and predominately, to positively affect occupational skills desired by an employer.

Interactive teaching and training systems generally are comprised of an introduction segment, which demonstrates and introduces a trainee to basic information in a multimedia format; a teaching and training segment that leads the trainee through training, during which the trainee interacts with the system; an examination segment, which tests the trainee's understanding and comprehension of materials presented during the teaching and training segment.

U.S. Pat. No. 5,987,443 is directed to a system, method and article of manufacture for rule-based expert training for building success in a business endeavor, wherein the system simulates a real-world environment and provides feedback to a user.

U.S. Pat. No. 5,885,083 is directed to a system and method for multi-modal interactive speech training, wherein the system is enabled for speech synthesis, speech recognition and visual representation of non-native vocabulary elements to promote rapid comprehension through neuro-linguistic programming of the individual.

There are currently many interactive teaching and training systems available. However, there is currently a deficiency in the art of training methodology for making the interactive teaching and training systems more efficient, and for demonstrating and teaching occupational skills. That is, a need exists for a training methodology that would maximize the efficiency for demonstrating and teaching occupational skills to facilitate improvement in retention of training materials by a trainee.

SUMMARY OF THE INVENTION

It is an object of the present invention to provide for a training methodology that is easily customizable for different occupations.

It is an object of the present invention to provide for a training methodology that is optimally functional for increasing retention of course material by a trainee.

It is yet another object of the present invention to provide for training methodology for piquing a trainee's interest and promoting participation in course material.

Still, yet another object of the present invention is to provide for a training methodology that is streamlined to provide effortless navigation though the course material by the trainee.

It is a further object of the present invention to provide for training methodology that is enabled to monitor and track a trainee's progress throughout training for making management decisions, such as hiring, retention and promotion of the trainee.

It is an object of the present invention to provide for a training methodology that enables a trainee to learn at his or her own pace and which allows a trainee to save his or her training progress if the trainee wants to terminate a training session and restart the training session at a later point in time.

Thus according to a preferred embodiment of the present invention, there is provided an interactive training methodology for demonstrating and teaching occupational skills to a trainee. The training methodology is embodied in a course comprising one or more training classes each comprising one or more training modules. The methodology of the present invention comprises: selecting a class from the one or more training classes for demonstrating and teaching a subset of occupational skills; then for each class: selecting a training module, wherein the training module correlates to one occupational skill of the subset of occupational skills; presenting a logical training sequence for the occupational skill; and interposing during the logical training sequence one or more queries for evaluating the trainee's comprehension of the one occupational skill and in response to trainee's answers to the one or more queries, modifying the logical training sequence until the trainee reaches a satisfactory level for the one occupational skill. The logical training sequence of the present invention is modified by providing video clips of a simulation of an occupational skill from different angles, perspective views or by showing previously omitted video clips, for example.

The present invention thus provides a scenario comprising a depiction of a simulation of an occupational skill for the purpose of illustrating the proper performance of said skill. The scenario comprises a plurality of scenes to illustrate an event or portion of an event from a particular view or perspective relating to the performance of the occupational skill. Upon beginning training, the trainee will view the scenario which may have one or more omitted scenes necessary to completely evaluate the scenario. At the conclusion of at least one scene of a plurality of scenes the trainee will be asked at least one question regarding the occupational skill which solicits a choice from said trainee. If the trainee answers correctly the training will continue with the display of another scenario until all scenarios of the class are completed. If the trainee answers incorrectly then a follow-up scenario will be presented for additional instruction, which will generally include one or more of the omitted scene from the first scenario. An additional question may then be asked.

A more complete understanding of the present invention, as well as further features and advantages of the present invention, will be obtained by reference to the following detailed description and drawings.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENT OF THE INVENTION

Figure 1:
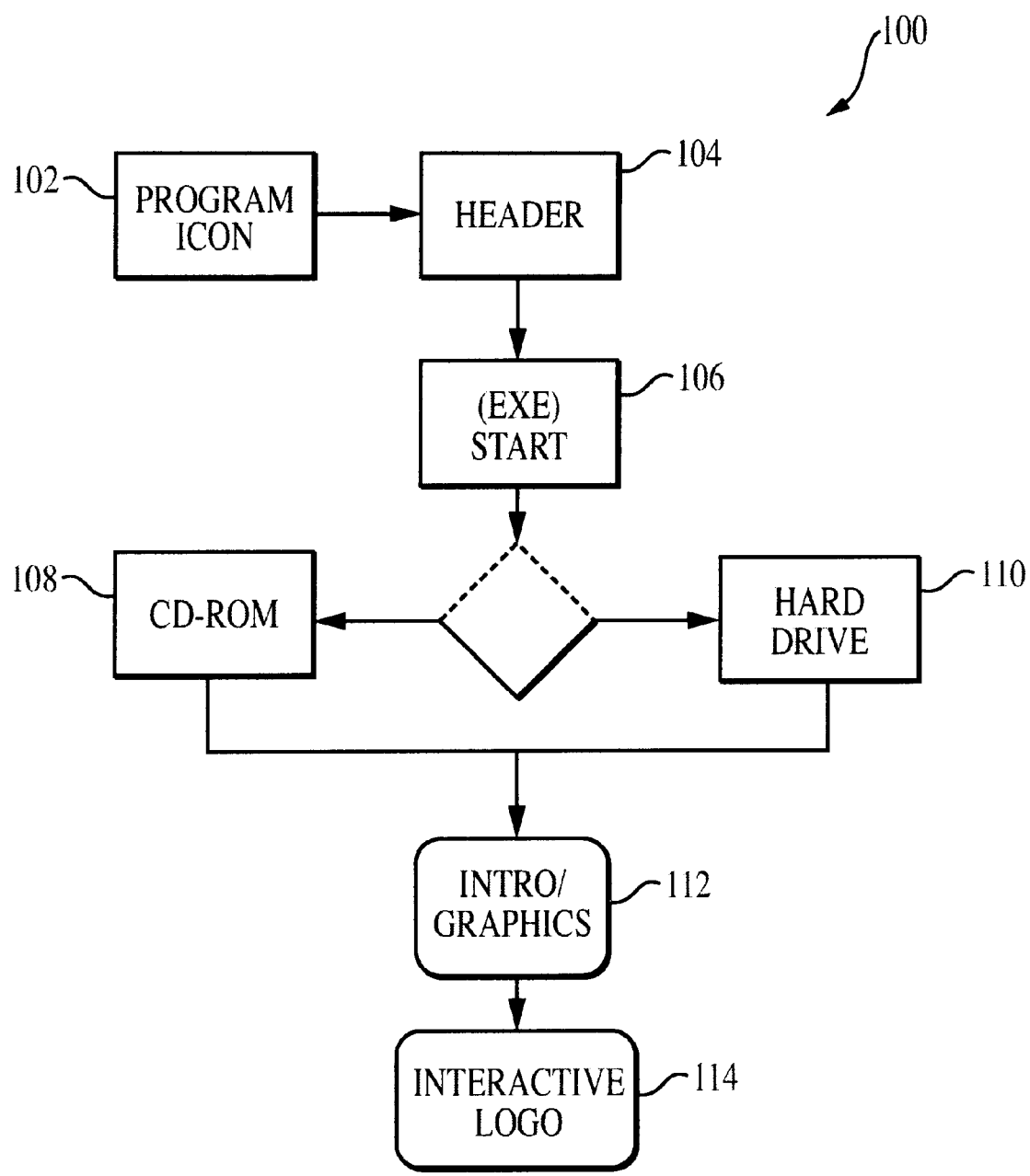
FIG. 1 is an block diagram that depicts an instantiation of a program embodying the present invention.

The present invention is directed to a system and method for the interactive multimedia teaching of occupational skills, through the use of audiovisual presentations. The invention is designed to enhance retention in a trainee by demonstrating, through the multimedia presentation, the occupational skills necessary for proper performance of an occupational skill. The invention improves recognition of certain occupational scenarios, which improves the cognitive abilities of the trainee.

Audiovisual Overview is defined as computer based multimedia presentation which may include video or film clips, pictures, talking heads, sound, graphics and text to provide a user with a summary of the training material to be presented.

Audiovisual Presentation is defined as a computer based multimedia presentation which may include video or film clips, pictures, sound, graphics, and text including a plurality of scenarios used for teaching an occupational skill. An audiovisual presentation may include an introduction regarding the presentation, a scenario, made of a plurality of scenes and a conclusion or summary.

Occupational Skill is defined as any occupational or avocational skills necessary to perform an occupation, avocation or hobby known to one skilled in the art, including by way of example, but not limited to; Detective Training, Identifying Behaviors, Interview/Interrogation Sexual Harassment, Workplace Violence, Blood borne Pathogens, Point of Sale, Customer Service, Inventory Preparation, Inventory Control, Shipping/Receiving, Shortage Awareness, Operations, Vault/Cash Office, and Fundraising.

Occupational Skill Subset is defined as a portion or a fraction of the skills that comprise an Occupational Skill.

Overview Module is defined as a computer based multimedia presentation which may include video or film clips, pictures, sound, graphics and text to provide a user with a summary of the class occupational skills to be presented.

Scenario is defined as a computer-based multimedia presentation which may include video or film clips, pictures, sound, graphics, and text including a plurality of scenes depicting a simulation of an occupational skill through the action of at least one person for the purpose of illustrating the proper performance of at least one occupational skill.

Scene is defined as a computer based multimedia presentation which may include video or film clips, pictures, sound, graphics, and text showing an event or portion of an event from a particular view or perspective.

Training Class or Class is defined as a set of modules of a computer based interactive multimedia program comprising an Overview Module and at least one training module for providing instruction regarding an occupational skill.

Training Module is defined as a computer based multimedia presentation which may include video or film clips, pictures, sound, graphics and text comprising at least one interactive scenario to provide a user with instruction regarding the performance of an occupational skills.

Figure 1A:
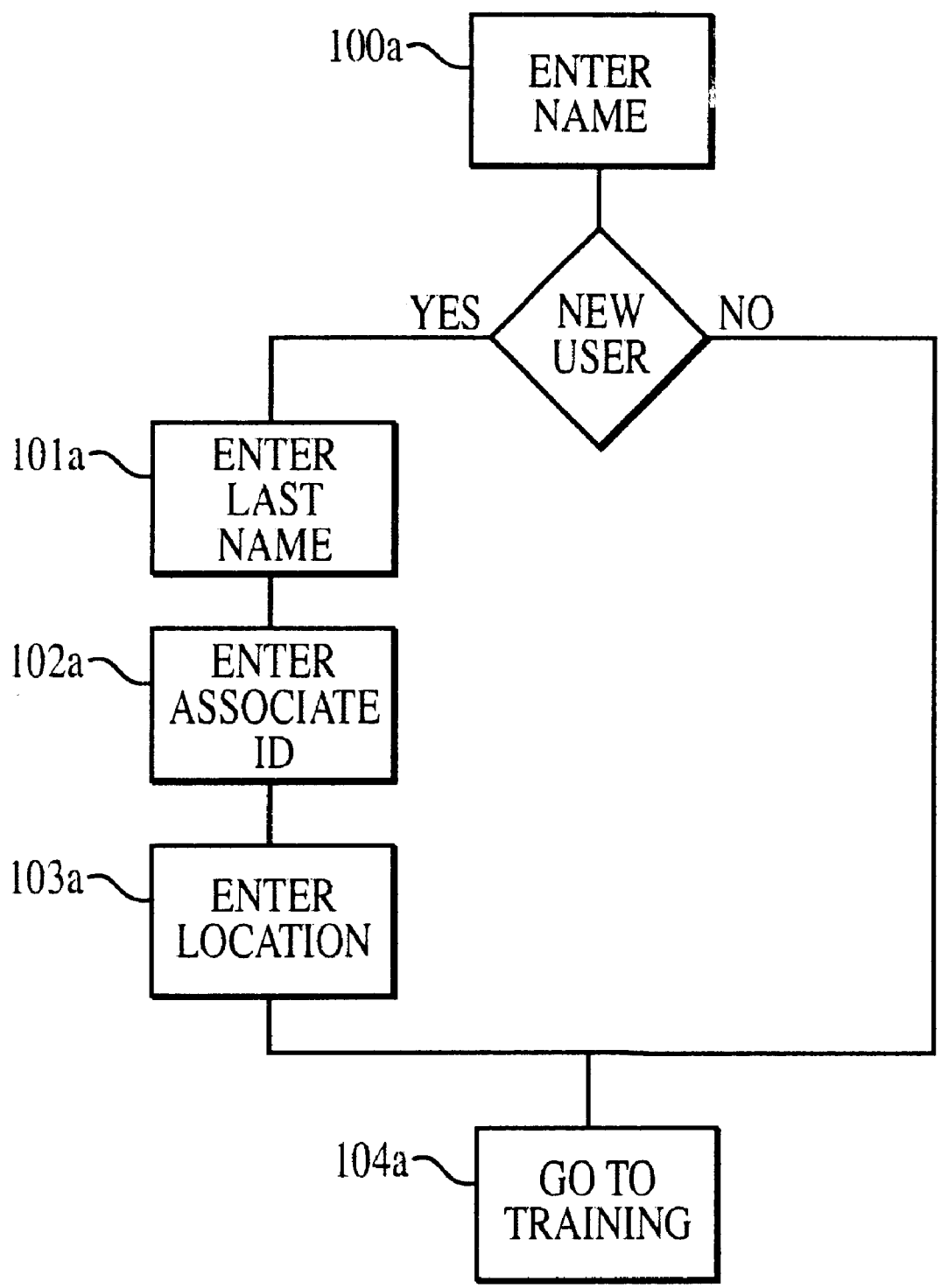
FIG. 1a is an exemplary flowchart that depicts the sign-on procedure for the present invention.

The block diagram of FIG. 1 depicts one method for the instantiation of a program embodying the present invention. A trainee may invoke a program 100 by clicking a program icon 102 with a pointing device (e.g., a mouse). The program icon 102 in turn executes a header 104, which in turn executes a start component 106. The start component 106, accesses both a CD-ROM 108 and a Hard Drive 110 to display introductory graphics 112, and prompts the trainee to click an interactive logo 114 with the pointing device. Once the trainee has clicked the interactive logo, the program 100 is instantiated. As shown on FIG. 1a, once the program has been instantiated, the trainee is presented with an electronic form on which to enter, using an input device, his/her name and then by clicking with a pointing device on a button to indicate that his/her name has been entered 100a.

If the trainee has previously used the system, the training program will allow the user to continue with training previously started 104a. If the trainee is using the system for the first time, the system will ask the trainee to establish a user account by additionally entering the trainee's last name 101a, an associate ID 102a and a location 103a. The recording of the trainees location is significant because the system can be embodied in a portable computer or LAN and can therefore be invoked from various locations. Upon completing the system sign-on the trainee is prompted with a main menu.

Figure 3:
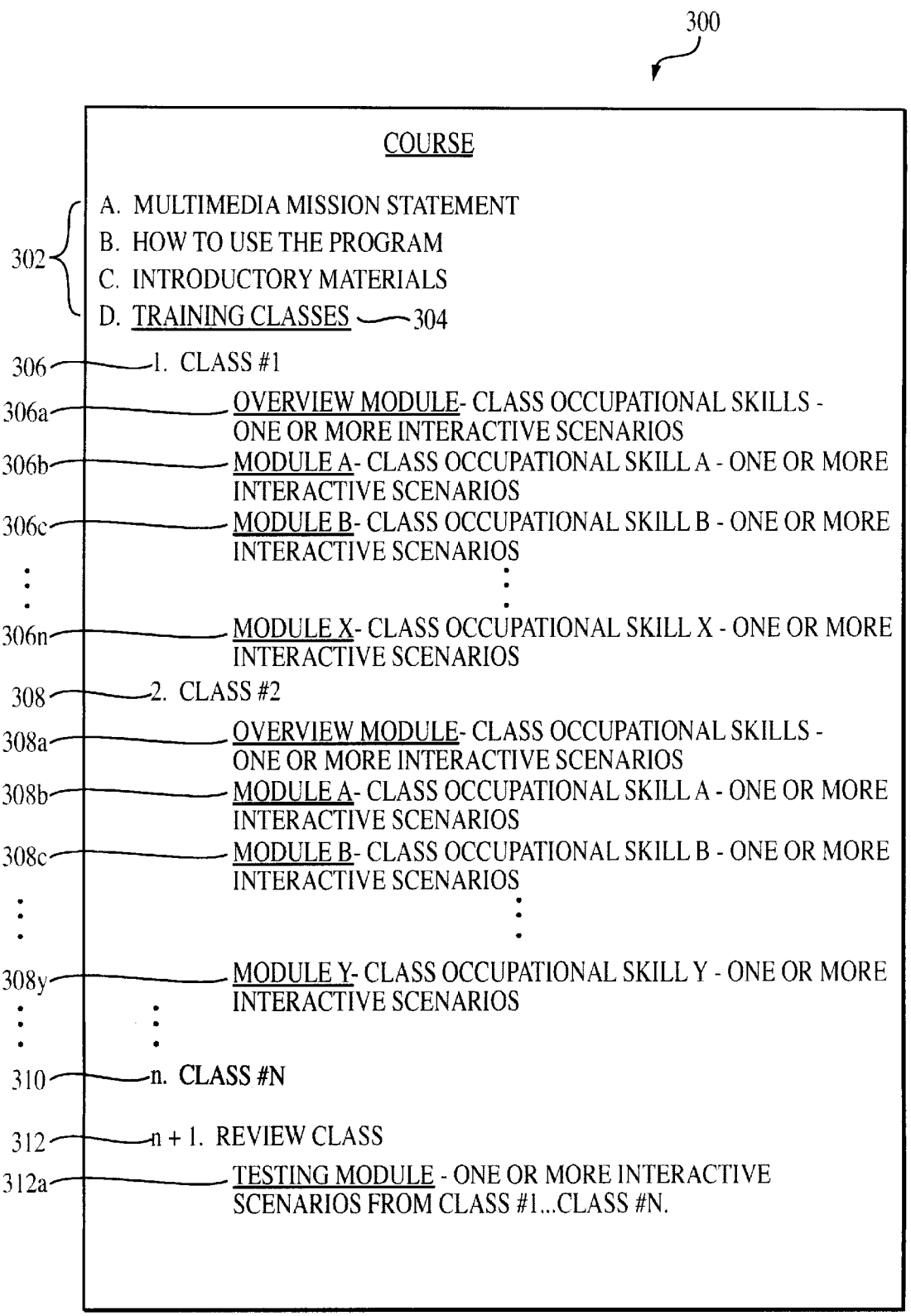
FIG. 3 is an outline of the structure of the program embodying the present invention.

As illustrated in FIG. 3, in one embodiment, the trainee is prompted to select one of four menu options, including Mission 302, How to Use the System 302, Ethics 302 and Classes 304. However, it is contemplated that more than four options may be available for selection by the trainee.

The Mission 302 menu option presents the trainee with an audiovisual presentation explaining the purpose of the interactive choice-based scenario training program. At the conclusion of the presentation, the trainee can select, using a pointing device a button to return to the main menu.

The How the Use the System 302 menu option, presents the trainee with an audiovisual presentation explaining how to use the system, including, how to select a menu option, proceed with training and pause or exit the system.

The Ethics and Conduct 302 menu option presents the trainee with an audiovisual presentation instructing the trainees with regard to ethical duties connected to the training material.

By selecting Classes 304 the trainee can access the training module main menu of the system. The main menu provides the trainee with access to the training module. The training module includes a plurality of classes 306 relating to the occupation that is to be trained and a review presentation.

Figure 3A:
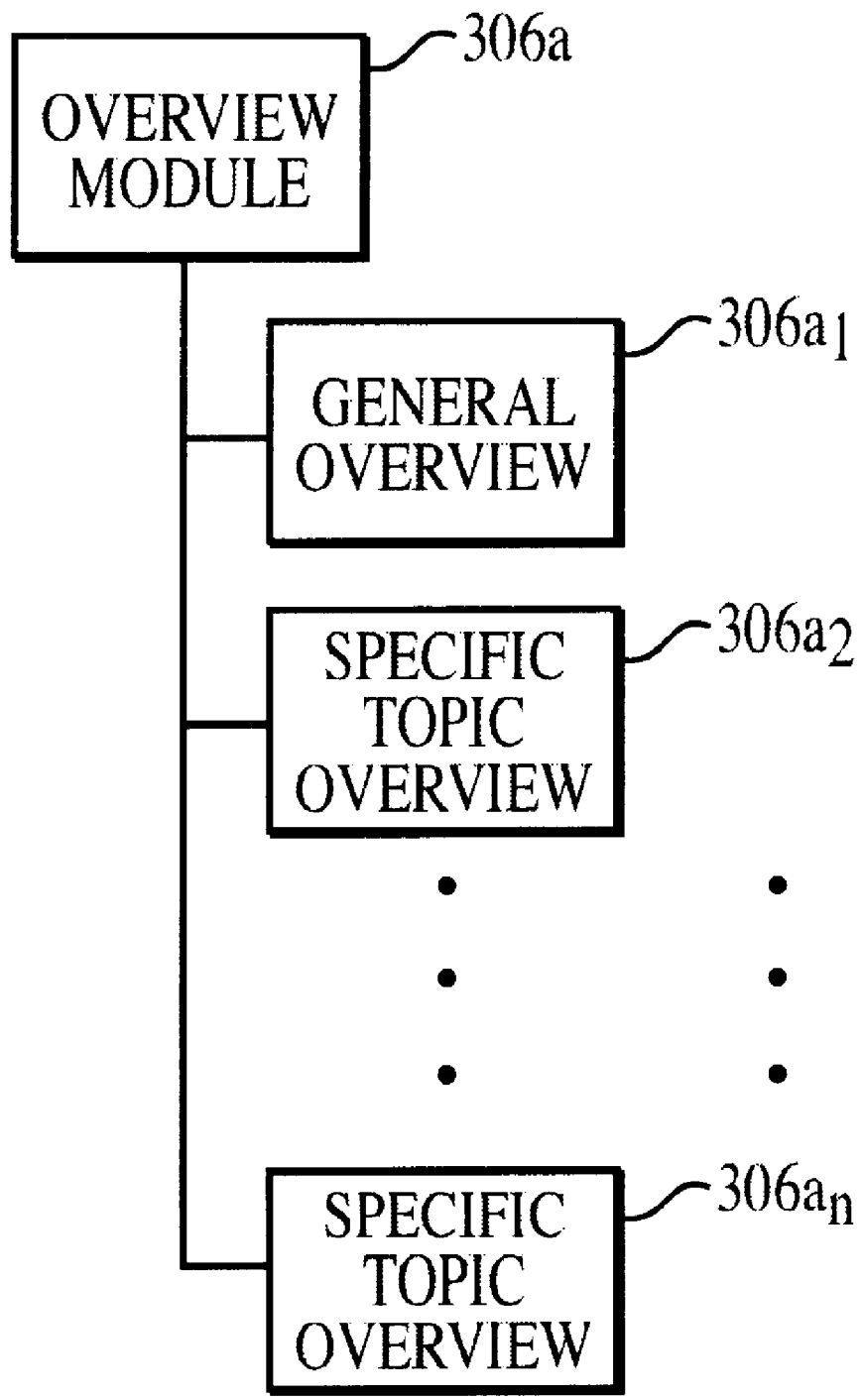
FIG. 3a is a block diagram that depicts the Overview Module of the program embodying the present invention.

As illustrated in FIG. 3, each class will include an Overview Module 306(a) and a plurality of training modules 306(b). As illustrated in FIG. 3(a) The Overview Module may include a general audiovisual overview 306($a_1$) of a particular occupational skill and a plurality of specific topic overviews 306($a_{2-n}$) of the occupational skills to be taught in each class, in order to provide the trainee with background information with regard to the occupation skill.

Figure 3B:
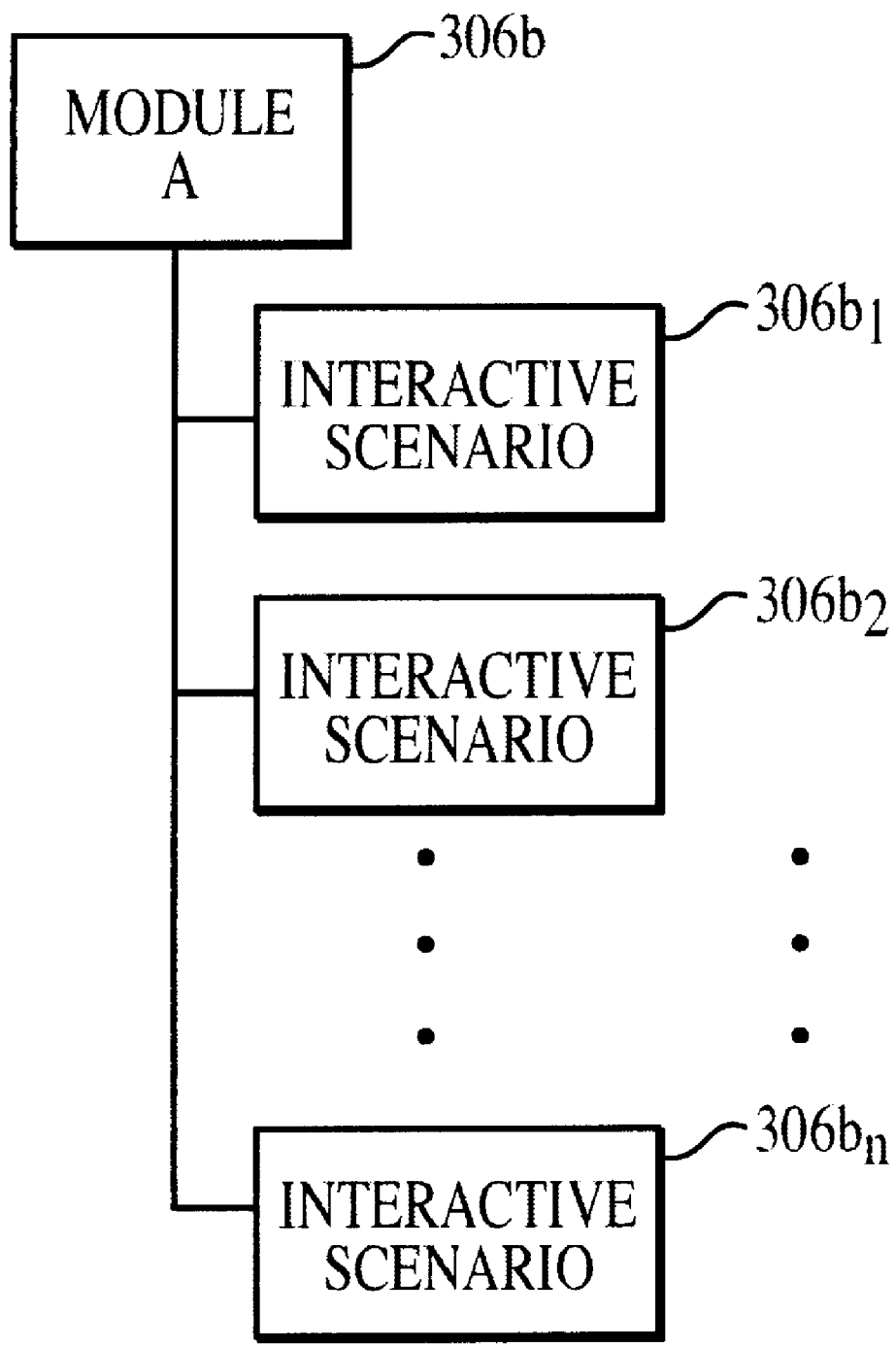
FIG. 3b is a block diagram that depicts a training Module of the program embodying the present invention.

As illustrated in FIG. 3(b), each class will also include at least one training module 306(b) through 306(n) of a particular class to provide instruction on a particular aspect of the occupational skill to be taught in the class, each module having at least one interactive scenario 306($b_1$)through 306($b_n$).

Upon selecting one of the menu training modules 306(b) of a class 304 the trainee will be directed to an audiovisual presentation 306($b_1$) comprising at least one of a plurality of audiovisual scenes for demonstrating a complete scenario relating to a selected occupational skill.

Figure 2:
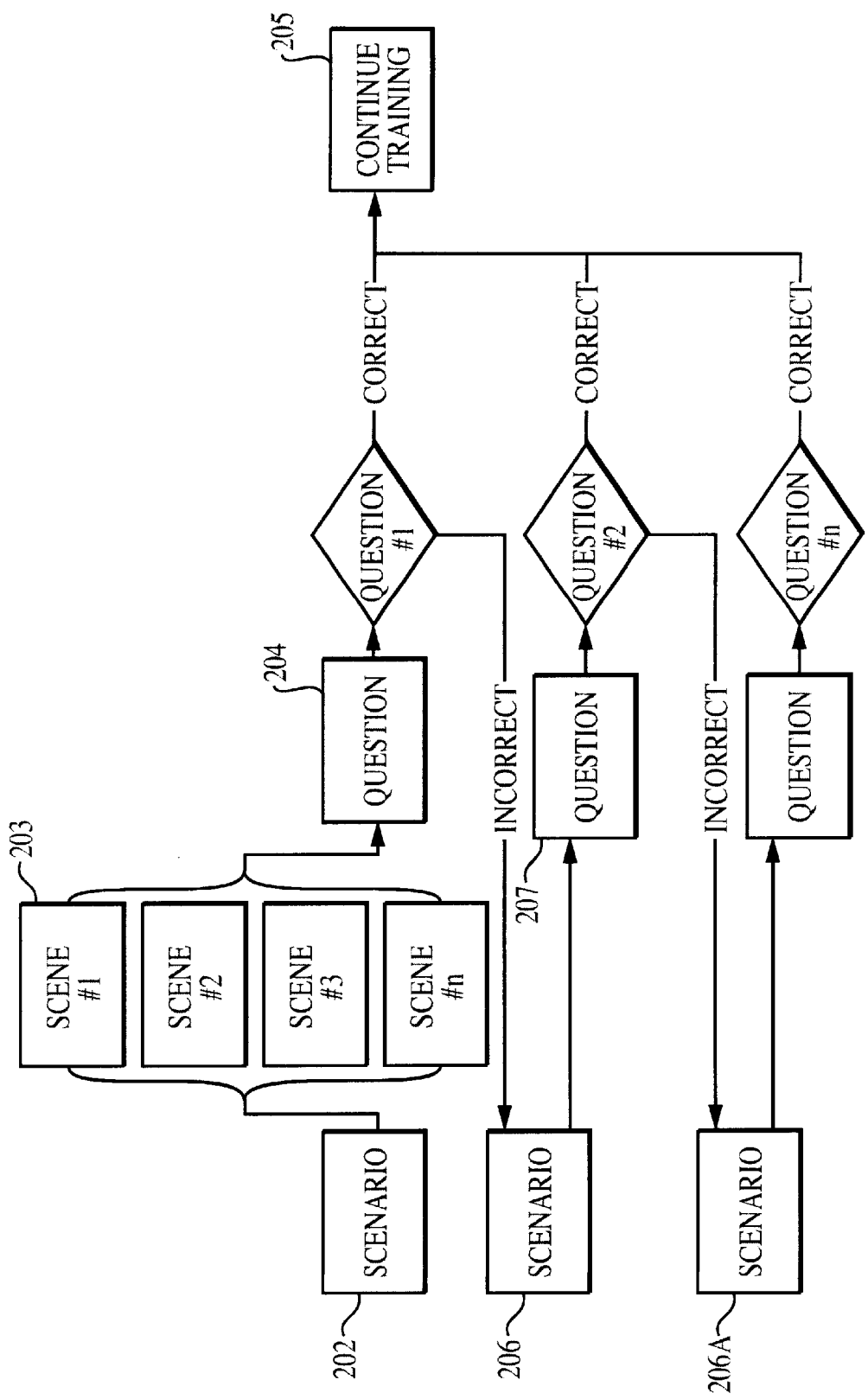
FIG. 2 is an exemplary flowchart that depicts an interactive training methodology for demonstrating and teaching occupational skills embodied by the present invention.

Referring to FIG. 2, an interactive audiovisual presentation according to the present invention includes a scenario 202 for providing instruction with regard the performance of an occupational skill. The scenario comprises a plurality of scenes 203 for illustrating an event or portion of an event from a particular view or perspective relating to the performance of the occupational skill. At the beginning of a training session, the trainee will view a scenario which may have one or more omitted scenes, which scenes are necessary to completely evaluate the scenario. At the conclusion of at least one scene of a plurality of scenes, a query 204 will be presented to the trainee regarding the occupational skill which query solicits a choice from said trainee. "Query" is defined as one or more questions which must be correctly answered by the trainee in order to demonstrate comprehension of the occupational skill. If the trainee answers correctly, the training will continue 205 with the display of another scenario until all scenarios of the class are completed. If the trainee answers incorrectly, then a follow-up scenario 206 will be presented for additional instruction, which will generally include one or more of the omitted scenes from the first scenario. An additional question 207 may then be asked. This process can be repeated for any number of scene presentations and questions. Each additional repetition on the same point or issue may prompt the inclusion of additional previously omitted scents.

The follow-up scenario 206 can be presented in different ways, but will generally include an omitted scene. The omitted scene may depict the particular scene from either a different viewing angle, a close-up view of a portion of a scene or will include a portion of the scene occurring before or after the previously presented scene. It is understood that each of the scenarios 206, 206A illustrated in FIG. 2 may have a plurality of scenes 1, 2, 3 . . . n, as illustrated for scenario 202.

Upon completion of all the training modules, a summary of the instruction with regard to the particular occupational skill, will be presented. Additionally the trainee's performance can be evaluated by recording the number of correct and incorrect responses or evaluated as a function of the time required by the trainee to respond to each query. The summary will include the complete scenario including the at least one omitted scene from the plurality of scenes. The use of a partial scenario to suggest a result that is different from the result obtained when the complete scenario is presented will reinforce the trainee's comprehension of the details involved in the occupational skill.

As will be understood by those of ordinary skill in the art, the present invention may be carried out on any suitable computer or computer network. Alternatively, the present invention is contemplated to be employed on the Internet, and on an Intranet of the users specification.

Figure 4:
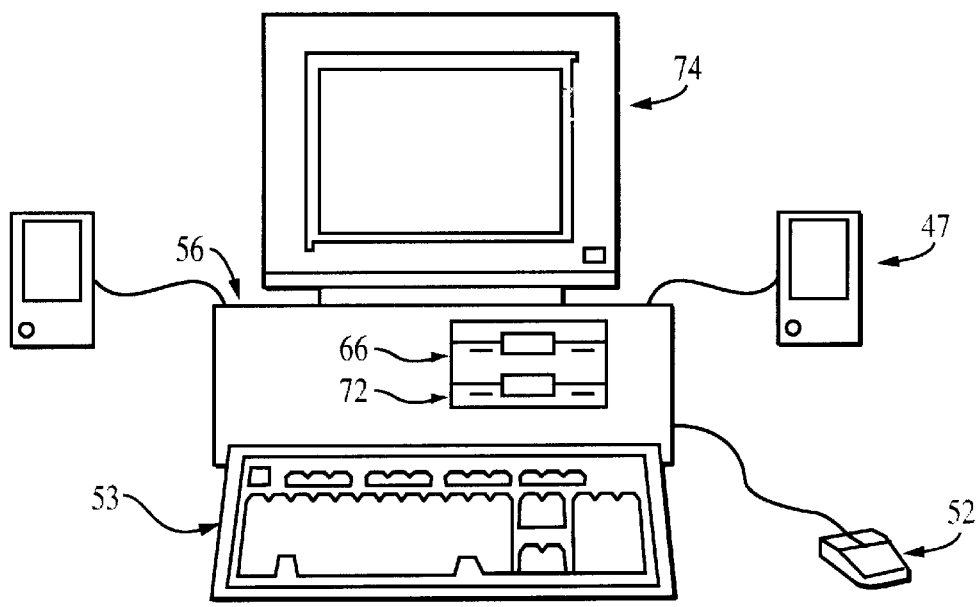
FIG. 4 illustrates, as an example, a computer of a type that may be used in the practice of this invention.

Viewed externally in FIG. 4, a computer system has a central processing unit 56 having disk drives 66 and 72. Disk drive indications 66 and 72 are merely symbolic of a number of disk drives that might be accommodated by the computer system. Typically, these would include a floppy disk drive such as 66, a hard disk drive (not shown externally) and a CD-ROM drive indicated by slot 72. The number and type of drives may vary with different computer configurations. The computer has a display 74 upon which information is displayed and speakers 47 for audio output. A keyboard 53 and a mouse 52 are normally used as input devices.

Figure 5:
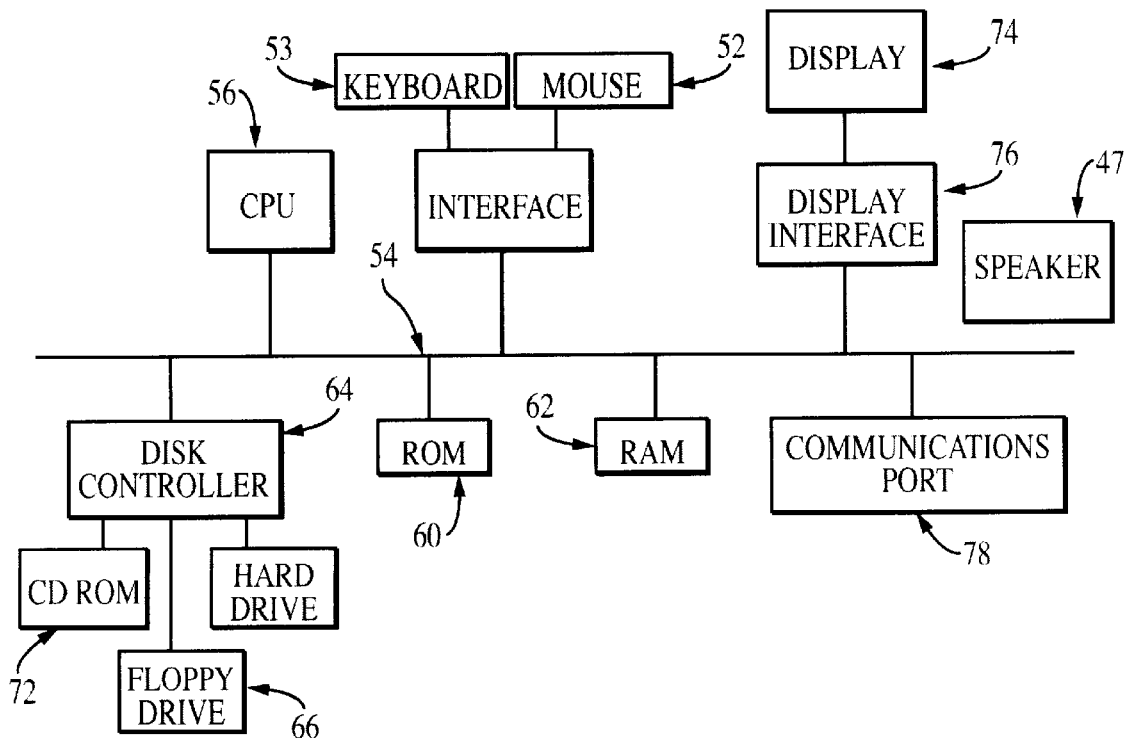
FIG. 5 shows a block diagram of the internal hardware of the computer of FIG. 4.

As illustrated in FIG. 5, a bus 54 serves as the main signal and data conduit, interconnecting the other components of the computer. CPU 56 is the central processing unit of the system, performing calculations and logic operations required to execute programs. Read only memory 60 and random access memory 62 constitute the main memory of the computer. Disk controller 64 interfaces on or more disk drives to the system bus 54. These disk drives may be floppy disk drives, such as 66, internal or external hard drives, such as 70, or CD ROM or DVD (Digital Video Disks) drives, such as 72. A display interface 74 interfaces a display 76 and permits information from the bus to be viewed on the display. Communications with external devices can occur over communications port 78. Audio signals are supplied to external speakers over a sound port.

Typically, memory media such as a CD-ROM, or Digital Video Disk will contain the program information for controlling the computer to enable the computer to perform its functions in accordance with the invention.

Figure 6:
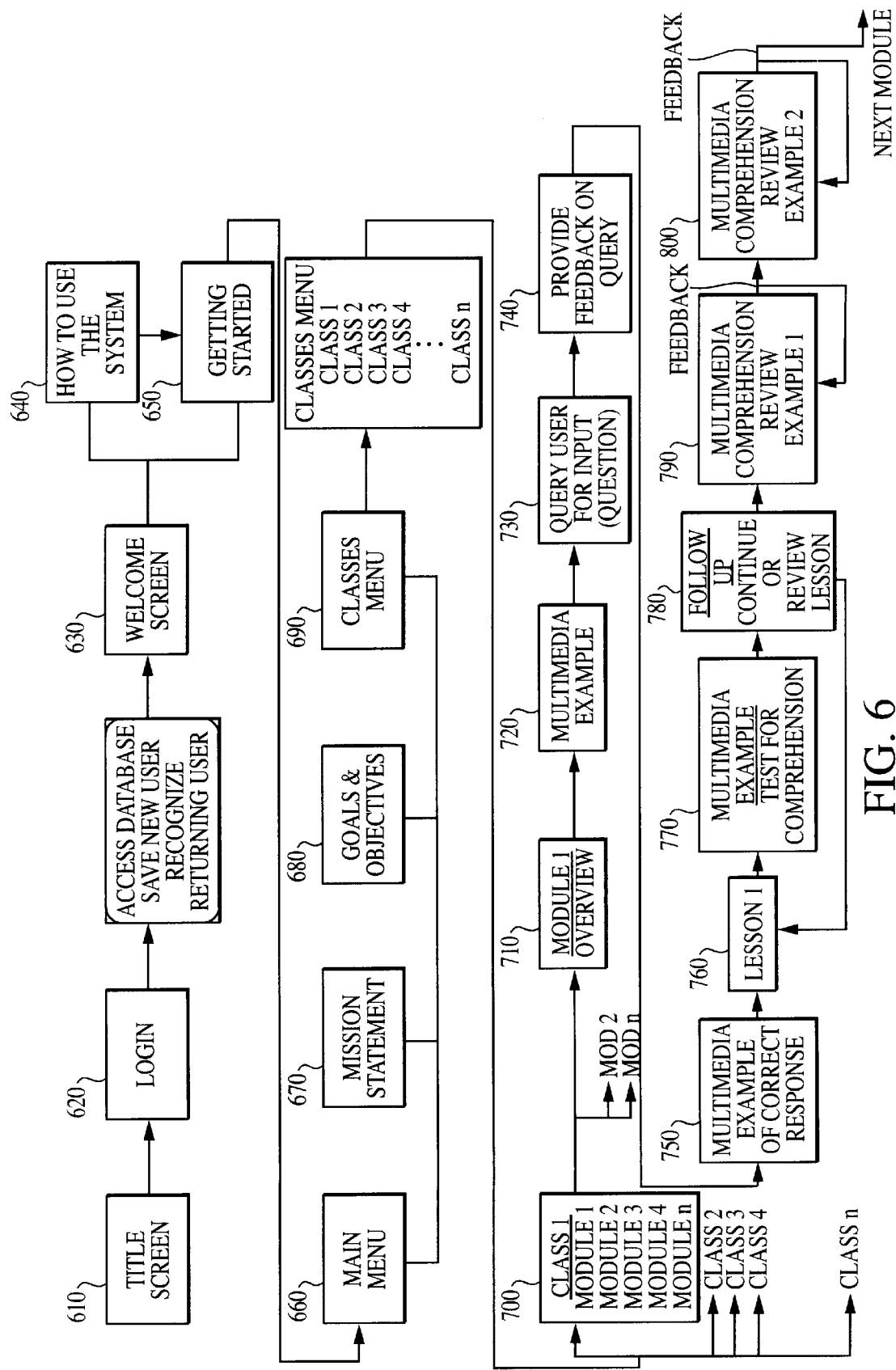
FIG. 6 shows a block diagram of the course structure of the present invention.

As illustrated in FIG. 6 the present invention provides an interactive multimedia training method wherein a course title screen 610 is presented followed by a login screen 620. The login screen provides the portal whereby the user accesses the training program of the invention. The program conventionally provides for the entry of a login password which may be alpha numeric and case-sensitive. The login screen explains how to log-on to the system. In one embodiment, the prospective trainee enters a name and identifying numerical data. The computer system then accesses the database to establish a new record for a new user. After an initial logon is completed, the returning user is recognized by his or her password for future training sessions. The new user or returning user is welcomed at a welcome screen 630.

The user is prompted to acquaint himself or herself with the system by accessing the How to Use screen 640 or the Getting Started screen (also identified as the Get Started screen) 650. "System" is defined as the training methodology of the present invention embodied in a computer-readable medium. The How to Use screen 640 explains how to navigate the system. The Get Started screen prompts the user to the Main Menu 660. The Main Menu lists the Course Title and provides options for accessing the Mission Statement 670, Course Goals and Objectives 680 and Classes Menu 690. The Classes Menu provides a list of classes within the training course relating to a skill to be taught.

Each Class is comprised of a series of Training Modules 710. Each Training Module comprises a multimedia presentation having at least one interactive scenario simulating a skill through the actions of at least one person. Each Training Module has an Overview, an example of the skill being taught 720 followed by a query 730, an opportunity for feedback on the query 740, and a multimedia example of a correct response to the query 750. The Training Module further comprises at least one lesson 760, a multimedia example of the skill being taught with a test of the user's comprehension 770 and follow-up 780 enabling the user to return to the beginning of the lesson 760. A Multimedia comprehension review comprising at least one example Scenario 790 is also provided. Successful completion of the Review of each Class results in the issuance of a Certificate of Completion of the Course.

Described hereinbelow is a representative example of detective training as would be undertaken by a trainee in connection with the execution of the system and method of the present invention. In the detective training the lessons contain queries for the trainee to answer based on five scenarios (i.e. entering, selecting, concealing, continuous observation and exiting). Each scenario may have one or more omitted scenes. For example, the trainee may view a scenario simulating an apparent theft of merchandise from a retail store. The trainee will first see a person approach a. merchandise display rack with a shopping bag in hand and then proceed to place merchandise into the shopping bag and then proceed to the store exit. At the conclusion of the scene, the trainee must correctly answer a query. If the trainee answers incorrectly, then a follow-up scenario is depicted which will include one or more omitted scenes from the first scenario which may be shown from a different angle. For example, the scene showing the apparent theft is repeated immediately after the trainee views the apparent thief talking to a store employee about an "even exchange" for some merchandise and the person being instructed to select merchandise of a more appropriate size. One or more additional questions may then be asked. This process is repeated until the trainee correctly answers the query. Once the first scenario is completed, the trainee is faced with additional scenarios and must successfully answer queries based thereon to complete the class.

The representative example of detective training provides examination scenarios for the trainee, in the form of reviews Each examination scenario is followed by a question which must be correctly answered to complete the course. Upon completion of the course, the trainee receives a Certificate of successfully completing the detective training.

The invention also provides for a system administrator, manager, employer and the like to evaluate the trainee's performance.

While the invention has been particularly shown and described with respect to a preferred embodiment thereof, it will be understood by those skilled in the art that the foregoing and other changes in form and details may be made therein without departing from the spirit and scope of the invention.

What is claimed is:

1. An interactive choice-based scenario training method for demonstrating and teaching occupational skills to a trainee, said method comprising:
   (a) providing at least one audiovisual overview for an occupational skill to familiarize the trainee with said occupational skill;
   (b) displaying a scenario having at least one omitted scene of an audiovisual presentation, wherein a plurality of scenes from said audiovisual presentation will demonstrate a complete scenario related to said occupational skill;
   (c) interposing at least one query for evaluating said trainee's comprehension of said occupational skill, said query enabling a trainee choice;
   (d) responding to the trainee choice by selecting and displaying a follow-up scenario having an omitted scene from said at least one omitted scene, said selection being a function of the trainee choice;
   (e) utilizing said at least one omitted scene from said plurality of scenes for demonstrating said occupational skill;
   (f) summarizing and displaying the complete scenario comprising the at least one omitted scene to reinforce the trainee's comprehension of said occupational skill.

2. The interactive choice-based scenario training method claimed in claim 1, wherein the training method is embodied in a course comprising one or more training classes each comprising one or more training modules, said training method further comprising:
   (a) selecting a class from said one or more training classes said classes demonstrating and teaching a subset of said occupational skills;
   (b) selecting a training module for each class, wherein said training module correlates to an occupational skill of said subset of occupational skills.

3. The interactive choice-based scenario training method claimed in claim 1, wherein said audiovisual overview includes audio, video and text.

4. The interactive choice-based scenario training method claimed in claim 1, wherein said audiovisual presentation includes audio, video and text.

5. The interactive choice-based scenario training method claimed in claim 1, wherein the at least one omitted scene is subsequently portrayed in step(e) from a viewing angle different than any previously displayed scene.

6. The interactive choice-based scenario training method claimed in claim 1, wherein the at least one omitted scene is a close up view of a previously displayed scene.

7. The interactive choice-based scenario training method claimed in claim 1, wherein the at least one omitted scene is a scene occurring before any previously displayed scene.

8. The interactive choice-based scenario training method claimed in claim 1, wherein the at least one omitted scene is a scene occurring after any previously displayed scene.

9. The interactive choice-based scenario training method claimed in claim 1, wherein the step of summarizing and displaying the complete scenario is accomplished by portraying the plurality of scenes for the complete scenario including the omitted scene.

10. The interactive choice-based scenario training method claimed in claim 2, further comprising an initiation of an audiovisual test for testing for the trainee's comprehension of said occupational skills for each class of the course, said test comprising:
   displaying a scenario having at least one omitted scene of an audiovisual presentation for testing comprehension of an occupational skill;
   interposing at least one query for evaluating said trainee's comprehension of said occupational skill being tested; and
   collecting and storing trainee's responses to said query.

11. The interactive choice-based scenario training method claimed in claim 10, wherein the step of collecting and storing trainee's responses includes collecting and storing the length of time required by the trainee to respond to said query.

12. The interactive choice-based scenario training method claimed in claim 11 wherein trainee's comprehension of occupational skill being tested is evaluated as a function of the number of correct answers given by the trainee.

13. The interactive choice-based scenario training method claimed in claim 11 wherein trainee's comprehension of occupational skill being tested is evaluated as a function of said time required by the trainee to respond to said query.

14. The interactive choice-based scenario training method claimed in claim 1, wherein the occupational skills are directed to a particular occupation.

15. A system for providing an interactive choice-based scenario training method for demonstrating and teaching occupational skills to a trainee, said system comprising:
   (a) means for providing at least one audiovisual overview for an occupational skill to familiarize the trainee with said occupational skill;
   (b) display means for displaying a scenario having at least one omitted scene of an audiovisual presentation, wherein a plurality of scenes from said audiovisual presentation will demonstrate a complete scenario related to said occupational skill;
   (c) means for interposing at least one query for evaluating said trainee's comprehension of said occupational skill, said query enabling a trainee choice;
   (d) input means for generating a signal representing a trainee response to said at least one query.
   (e) means for responding to the trainee's choice by selecting and displaying a follow-up scenario having an omitted scene from said at least one omitted scene, said selection being a function of the trainee choice;
   (f) means for utilizing said at least one omitted scene from said plurality of scenes for demonstrating said occupational skill;
   (g) means for summarizing and displaying the complete scenario comprising the at least one omitted scene to reinforce the trainee's comprehension of said occupational skill.

16. The system for interactive choice-based scenario training method claimed in claim 15, wherein said means for providing is selected form the group which includes a CD-ROM and a DVD.

17. The system for interactive choice-based scenario training method claimed in claim 15, wherein said audiovisual overview includes audio, video and text.

18. The system for interactive choice-based scenario training method claimed in claim 15, wherein said audiovisual presentation includes audio, video and text.

19. The system of claim 15, wherein the display means comprises a monitor and audio speakers.

20. The system of claim 15, wherein the input means is selected from the group consisting of a microphone, a pointing device and a keyboard.

21. The system of claim 20, wherein the pointing device is selected from the group consisting of a mouse, a trackball, a stylus and a digitizer.

22. A program storage device readable by machine, tangibly embodying a program of instructions executable by the machine to perform the method steps for demonstrating and teaching occupational skills to a trainee, the method steps comprising:
   (a) providing at least one audiovisual overview for an occupational skill to familiarize the trainee with said occupational skill;
   (b) displaying a scenario having at least one omitted scene of an audiovisual presentation, wherein a plurality of scenes from said audiovisual presentation will demonstrate a complete scenario related to said occupational skill;
   (c) interposing at least one query for evaluating said trainee's comprehension of said occupational skill, said query enabling a trainee choice;
   (d) responding to the trainee choice by selecting and displaying a follow-up scenario having an omitted scene from said one omitted scene, said selection being a function of the trainee choice;
   (e) utilizing at least one omitted scene from said plurality of scenes for demonstrating said occupational skill;
   (f) summarizing and displaying the complete scenario comprising the at least one omitted scene to reinforce the trainee's comprehension of said occupational skill.

23. The program storage device as claimed in claim 22, the method steps further including:
   displaying a course comprising one or more training classes each comprising one or more training modules, said training method further comprising:
   selecting a class from said one or more training classes, said classes demonstrating and teaching a subset of said occupational skills;
   selecting a training module for each class, wherein said training module correlates to an occupational skill defined within said subset of occupational skills.

24. The program storage device as claimed in claim 22, the method steps further including:
   presenting said audiovisual overview using audio, video and text.

25. The program storage device as claimed in claim 22, the method steps further including:
   presenting said audiovisual presentation using audio, video and text.

26. The program storage device as claimed in claim 22, the method steps further including:
   displaying the scene not yet displayed from a viewing angle different than any displayed scene.

27. The program storage device as claimed in claim 22, the method steps further including:

summarizing and displaying the complete scenario by portraying the plurality of scenes for the complete scenario from a viewing angle different than any displayed scene.

28. The program storage device as claimed in claim 22, the method steps further including:

summarizing and displaying the complete scenario by portraying the plurality of scenes for the complete scenario wherein the at least one omitted scene is a close up view of a previously displayed scene.

29. The program storage device as claimed in claim 22, the method steps further including:

summarizing and displaying the complete scenario by portraying the plurality of scenes for the complete scenario wherein the at least one omitted scene is a scene occurring before any previously displayed scene.

30. The program storage device as claimed in claim 22, the method steps further including:

summarizing and displaying the complete scenario by portraying the plurality of scenes for the complete scenario wherein the at least one omitted scene is a scene occurring after any previously displayed scene.

31. The program storage device as claimed in claim 22, the method steps further including:

testing the trainee's comprehension of said occupational skills for the course, said testing comprising:
      for each class:
         displaying at least one audiovisual presentation with an omitted scene for testing an occupational skill;
         interposing at least one query for evaluating said trainee's comprehension of said occupational skill being tested; and
         collecting and storing trainee's responses to the at least one query.

32. The program storage device as claimed in claim 22, the method steps further including:

collecting and storing the length of time required by the trainee to respond to the at least one query, thereby enabling evaluation of trainee's comprehension of occupational skill being tested.

* * * * *